(12) United States Patent
Trevisan et al.

(10) Patent No.: US 12,479,228 B2
(45) Date of Patent: Nov. 25, 2025

(54) METHOD AND APPARATUS FOR DECORATING OBJECTS BY MEANS OF SUBLIMATIC INKS

(71) Applicant: ATIU S.R.L., Verona (IT)

(72) Inventors: Tito Trevisan, Verona (IT); Alessandro Volpato, Verona (IT)

(73) Assignee: ATIU S.R.L. (IT)

( * ) Notice: Subject to any disclaimer, the term of this patent is extended or adjusted under 35 U.S.C. 154(b) by 109 days.

(21) Appl. No.: 18/002,701

(22) PCT Filed: Jun. 24, 2021

(86) PCT No.: PCT/IB2021/055599
§ 371 (c)(1),
(2) Date: Dec. 21, 2022

(87) PCT Pub. No.: WO2021/260613
PCT Pub. Date: Dec. 30, 2021

(65) Prior Publication Data
US 2023/0256763 A1    Aug. 17, 2023

(30) Foreign Application Priority Data
Jun. 25, 2020   (IT) .................... 102020000015289

(51) Int. Cl.
*B41M 5/035*        (2006.01)
*B65B 53/02*        (2006.01)

(52) U.S. Cl.
CPC .......... *B41M 5/0353* (2013.01); *B65B 53/02* (2013.01)

(58) Field of Classification Search
CPC . B41M 5/0353; B41M 5/0358; B44C 1/1716; B65B 53/02
See application file for complete search history.

(56) References Cited

U.S. PATENT DOCUMENTS

| 5,308,426 A | 5/1994 | Claveau |
| 5,492,466 A | 2/1996 | Frailey |

(Continued)

FOREIGN PATENT DOCUMENTS

| CN | 216585927 U | 5/2022 |
| DE | 4123129 C2 | 7/1995 |

(Continued)

OTHER PUBLICATIONS

Office Action issued on Oct. 8, 2024 in corresponding European Application No. 21742507.3.

(Continued)

*Primary Examiner* — Xiao S Zhao
*Assistant Examiner* — Victoria Bartlett
(74) *Attorney, Agent, or Firm* — The Belles Group, P.C.

(57) ABSTRACT

A method for decorating objects by means of sublimatic inks, which provides for the steps that consist in providing a shrink-wrap sheet-like element to which at least one layer of sublimatic inks is applied and joining two opposite ends of the sheet-like element in order to obtain a sleeve with the face of the sheet-like element directed toward the inside of the sleeve, inserting axially in the sleeve at least one object to be decorated, applying heat in order to obtain an at least partial shrink-wrapping of the sleeve, creating a difference in pressure between the internal side and the external side of the sleeve in order to establish a lower hydrostatic pressure on the inner side of the sleeve than on its outer side, and applying heat in order to cause the sublimation of the sublimatic inks.

8 Claims, 12 Drawing Sheets

(56) References Cited

U.S. PATENT DOCUMENTS

| | | | |
|---|---|---|---|
| 5,584,961 | A | 12/1996 | Ellsworth et al. |
| 5,962,368 | A * | 10/1999 | Poole .................. B41M 5/0353 |
| | | | 156/277 |
| 6,335,749 | B1 * | 1/2002 | Carizzoni ............ B41M 5/0353 |
| | | | 347/171 |
| 6,814,831 | B2 | 11/2004 | Drake |
| 2001/0038920 | A1 | 11/2001 | Hashimoto et al. |
| 2005/0249897 | A1 | 11/2005 | Fresnel |
| 2006/0283555 | A1 | 12/2006 | Green |
| 2009/0068383 | A1 | 3/2009 | Hann et al. |
| 2009/0233794 | A1 | 9/2009 | Trevisan |
| 2010/0326867 | A1 | 12/2010 | Fresnel |
| 2011/0226409 | A1 | 9/2011 | Wang et al. |
| 2011/0236608 | A1 | 9/2011 | Vavassori et al. |
| 2015/0323195 | A1 | 11/2015 | Chadwick et al. |
| 2018/0354226 | A1 * | 12/2018 | Circosta .................. B41M 5/42 |
| 2023/0256763 | A1 | 8/2023 | Trevisan et al. |

FOREIGN PATENT DOCUMENTS

| | | | |
|---|---|---|---|
| EP | 0451067 | A1 | 10/1991 |
| EP | 0888905 | A2 | 1/1999 |
| EP | 0953457 | A2 | 11/1999 |
| EP | 1432590 | A1 | 6/2004 |
| EP | 1752305 | A1 | 2/2007 |
| EP | 1910088 | A1 | 4/2008 |
| EP | 4171962 | A1 | 5/2023 |
| FR | 2719805 | A1 | 11/1995 |
| FR | 2719850 | A1 | 11/1995 |
| KR | 100685292 | B1 | 2/2007 |
| RU | 2082619 | C1 | 6/1997 |
| WO | 9959888 | A1 | 11/1999 |
| WO | 9962722 | A1 | 12/1999 |
| WO | 2004106082 | A1 | 12/2004 |
| WO | 2021260613 | A1 | 12/2021 |

OTHER PUBLICATIONS

Anonymous: "Convection Oven—Temperature Control Units (TCUs)—Hot Disk", May 31, 2017 (May 31, 2017), pp. 1-11, XP093210811, Retrieved from the Internet: URL: https://www.hotdiskinstruments.com/products/accessories/convection-oven/.

Office Action issued on Dec. 31, 2024 in corresponding Chinese Application No. 202180045208.3.

Opinion on the validity of Italian Patent No. 102020000015289.

Writ of Summons against Italian Patent No. 102020000015289.

Result of Consultation issued in European Application No. 21742507.3.

Letter accompanying subsequently filed items issued on Feb. 24, 2025 in European Application No. 21742507.3.

Polijet Clear 3D (E5) data sheet, Mar. 2, 2011.

Hot Disk, Temperature Control Units (TCUs), Convection Oven, https://www.hotdiskinstruments.com/products/accessories/convection-oven/ May 31, 2017.

Easycomposites: "Manual—OV301 Composite Curing Oven", Mar. 26, 2018, pp. 1-57, XP093251109, https://shop.gttag.ch/data/dokumente/00002647/OV301%20MKII%20Oven%20Manual.pdf.

Easycomposites: "OV301 Precision Benchtop Curing Oven—Easy Composites", Mar. 26, 2018, pp. 1-1, XP093251126, https://www.easycomposites.eu/ov301-precision-curing-oven.

Letter accompanying subsequent filed items issued in European Application No. 21742507.3, Aug. 3, 2023.

Communication Pursuant to Article 94(3) EPC issued in European Application No. 21742507.3, Oct. 8, 2024.

LR Technologies, Yamamoto, Constant Temperature Precision Oven (High Accuracy Fine Oven) DF412/612, Instruction Manual, pp. 1-75, First Edition Apr. 9, 2015.

Wisonsin Oven Corporation, Premium Control System, Data Acquistion and Control for Compositing Curing, Wisoven.com, Sep. 17, 2019, pp. 1 to 12.

VAC AERO International, Vacuum Systems for Composite Manufacturing, Nov. 13, 2018, pp. 1 to 10.

* cited by examiner

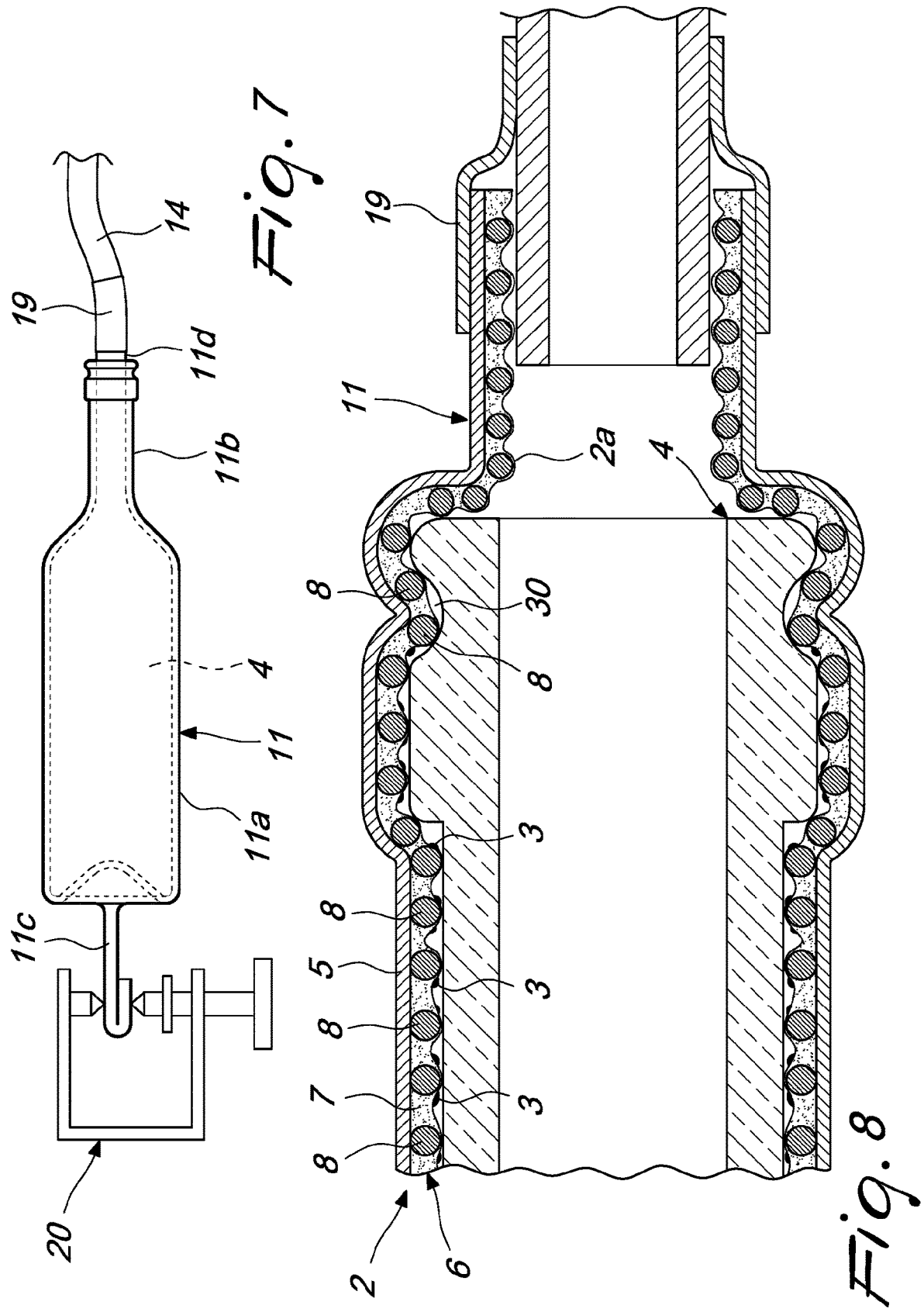

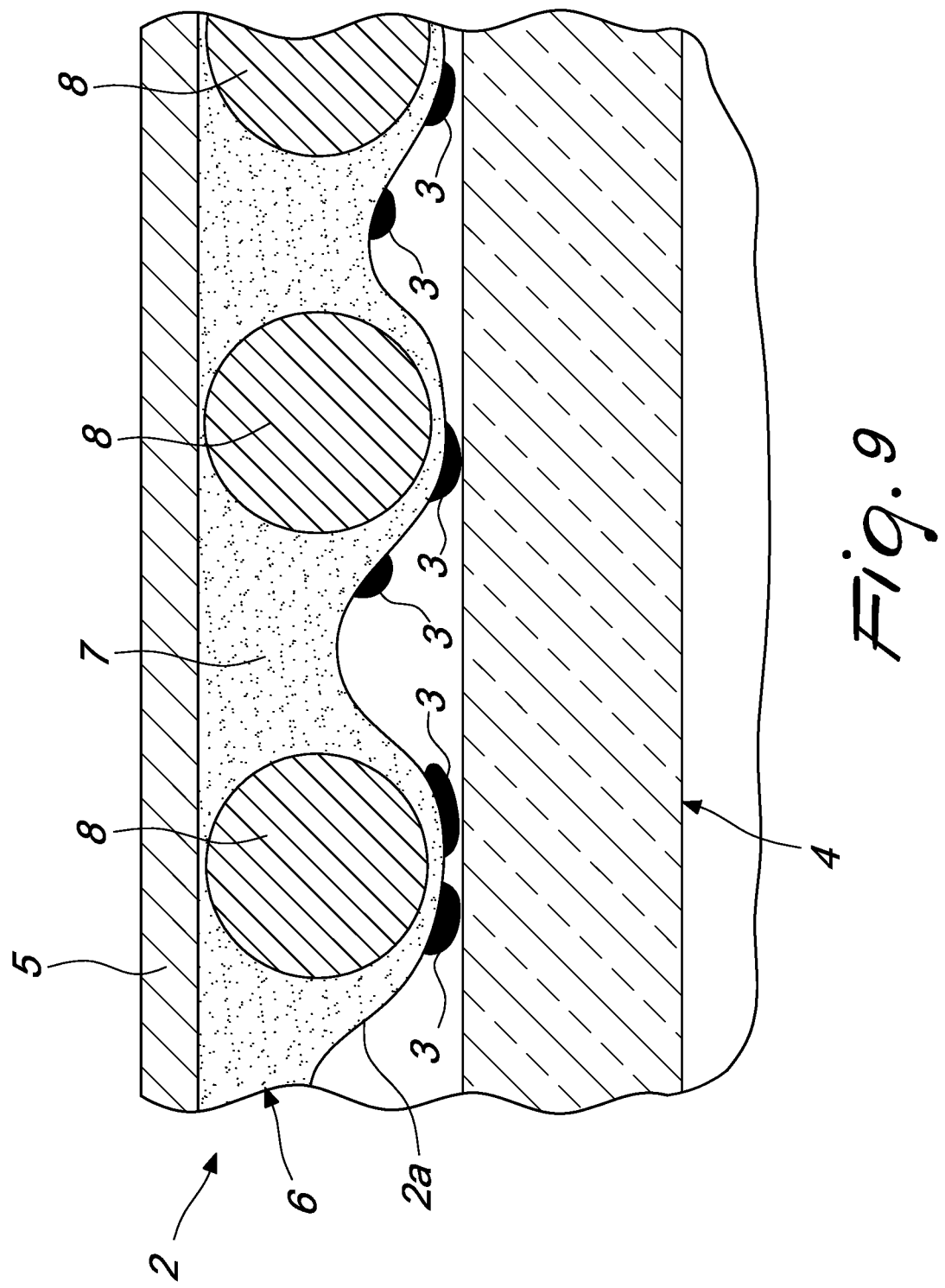

METHOD AND APPARATUS FOR DECORATING OBJECTS BY MEANS OF SUBLIMATIC INKS

CROSS-REFERENCE TO RELATED PATENT APPLICATIONS

This patent application is a U.S. national stage application under 35 U.S.C. § 371 of PCT application no. PCT/IB2021/055599, filed on Jun. 24, 2021, which claims priority from Italian patent application no. 102020000015289 filed on Jun. 25, 2020. The entire disclosure of the aforementioned priority applications are incorporated herein by reference in their entireties.

The present invention relates to a method and an apparatus for decorating objects by means of sublimatic inks, which are particularly but not necessarily suitable for decorating hollow objects.

Methods know in the jargon as "sublimation transfer" methods are known which are based on the transfer of images provided by means of sublimatic inks from a sheet-like medium, termed carrier, to a surface of an object to be decorated, termed imprintable material.

In particular, methods of this type provide essentially for depositing the sublimatic inks on one face of the sheet-like medium, placing the inked face of the sheet-like medium in contact with the surface of an object to be decorated, and applying heat to obtain the sublimation of the inks and their consequent transfer from the sheet-like medium to the object to be decorated.

The different ways of performing the currently known methods of this type determine different levels of quality and fidelity in the transfer of the images onto the objects to be decorated.

U.S. Pat. No. 5,308,426 describes, for example, a decoration method which uses a sheet-like medium made of thermo-elastoplastic material, which, besides being expensive, causes, if stretched or elongated, a loss of resolution of the transferred image and, if compressed, tends to form wrinkles which cause defects in the transferred image. Moreover, with the method taught in said prior art document it appears to be difficult to perfectly adapt the shape of the medium and consequently of the image to be transferred to the object to be decorated.

U.S. Pat. No. 6,814,831 teaches a method which uses one or more frames to lock perimetrically carrier sheet-like media made of elastoplastic material, which are subjected to deformation, by adding heat and applying a difference in pressure between their opposite faces, until the sublimation temperature of the inks is reached. This prior art document also provides for the possibility to thermoform, in a first step, the carrier sheet-like medium and to position it, in a second step, on the object to be decorated by applying suitable pressures and temperatures by means of elastoplastic sheet-like means and/or mechanical elements.

One drawback of this method derives from the impossibility to control the deformations of the carrier sheet-like media, with consequent instability in the contact between the carrier sheet-like media and the objects to be decorated and the obviously related graphic inaccuracies. Moreover, said method, in addition to considerably laborious operations, requires the use of a large number of elements and materials for its execution.

Another currently widespread method provides for wrapping the object to be decorated with the carrier sheet-like medium, mutually joining, in various ways, two opposite flaps thereof, and inserting the object wrapped by the carrier sheet-like medium in frames, such as those of the method described previously, or in a bag, so that by creating a vacuum the process pressure can be transmitted from the bag to the sheet-like medium that is wrapped around the object.

The drawbacks of this technique are the presence of joints due to the use of different frames, as well as the fact that the bags, in addition to not always being reusable, have plastic deformation limits, with consequent lack of uniformity in the pressures applied and consequent graphic imperfections in the transferred images.

A method is also known which provides for the use of a shrink-wrap sleeve on which the image to be transferred onto the object to be decorated can be printed directly on its internal surface or which can be used to make the actual carrier sheet-like medium adhere to the object to be decorated following its shrinkage.

This technique has the limitation of the variability, during the transfer of the image to the object to be decorated, of the pressure applied locally by the shrink-wrapped sleeve to the object.

Moreover, this technique does not allow control of the gases that form inside the sleeve during the transfer of the image and that can cause swellings with loss of intimate contact between the carrier and the receiving surface of the object and degradation of the graphic fidelity obtained.

EP0888905A2 teaches that in order to decorate an object by sublimation transfer it is possible to use a shrink-wrap sleeve obtained from a film, with an inked face facing the object to be decorated, to provide a heat-sealed enclosure in which the object to be decorated is inserted and, optionally, to extract air from the inside of the heat-sealed enclosure before proceeding to the heat transfer of the decoration. If the teachings of EP0888905A2 are applied to objects having conspicuous concavities and convexities, such as for example a bottle and its bottom, it is not possible to decorate uniformly all the points of the object, since it is impossible, with the method described in said patent, to extract the gases that are generated between the film and the object to be decorated, during the ink transfer step, and that cause such a partial counterpressure as to ruin the decoration on the surfaces with conspicuous concavities and convexities. Furthermore, the technique described in this prior art document does not allow decorating in a satisfactory manner surface regions of the object that have such concavities and convexities that they cannot be reached by mere shrink-wrapping of the sleeve.

Moreover, all the known methods described above do not offer fully satisfactory results in the decoration of objects having a particular shape and in particular of objects with drastic dimensional variations, regions with a conspicuous concavity or convexity, internal cavities accessible through openings, an axially symmetrical geometry and so on, such as, for example, furnishings, vases, ornamental statues, glass containers, such as bottles for liquids in general or perfume bottles, or metal objects, such as cans or flasks, or also objects made of ceramic material.

Carrier sheet-like media are also known, from EP1432590 and EP1910088, which have, on their face designed to be directed toward the object to be decorated, an irregular surface provided by means of the application of granular elements or fibers.

The use of such media has also shown room for improvement.

The aim of the present invention is to provide a method and an apparatus for decorating objects by means of sublimatic inks that are capable of improving the background art in one or more of the aspects mentioned above.

Within this aim, an object of the invention is to provide a method for decorating objects by means of sublimatic inks which is capable of offering better results than the background art in terms of quality and fidelity of the image transferred onto the object to be decorated.

Another object of the invention is to provide a method for decorating objects by means of sublimatic inks that can be provided easily with a small number of simple operations and at low cost.

Another object of the invention is to provide an apparatus for decorating objects that is easy and practical to use.

Another object of the present invention is to overcome the drawbacks of the background art in a manner that is alternative to any existing solutions.

Not the least object of the invention is to provide an apparatus that is highly reliable and is furthermore easy to provide so that it can be produced at competitive costs and with industrial methods.

This aim and these and other objects which will become more apparent hereinafter are achieved by a method for decorating objects by means of sublimatic inks according to claim 1, optionally provided with one or more of the characteristics of the dependent claims.

Further characteristics and advantages of the invention will become more apparent from the description of preferred but not exclusive embodiments of the method and the apparatus according to the invention, illustrated by way of non-limiting example in the accompanying drawings, wherein:

FIG. 7 is a lateral elevation view of the sealing of the sleeve;

FIG. 8 is an enlarged-scale sectional view of a portion of the sleeve after sealing;

FIG. 9 is an enlarged-scale sectional view of the carrier sheet-like medium in adhesion against the surface of the object to be decorated;

Figure 1:
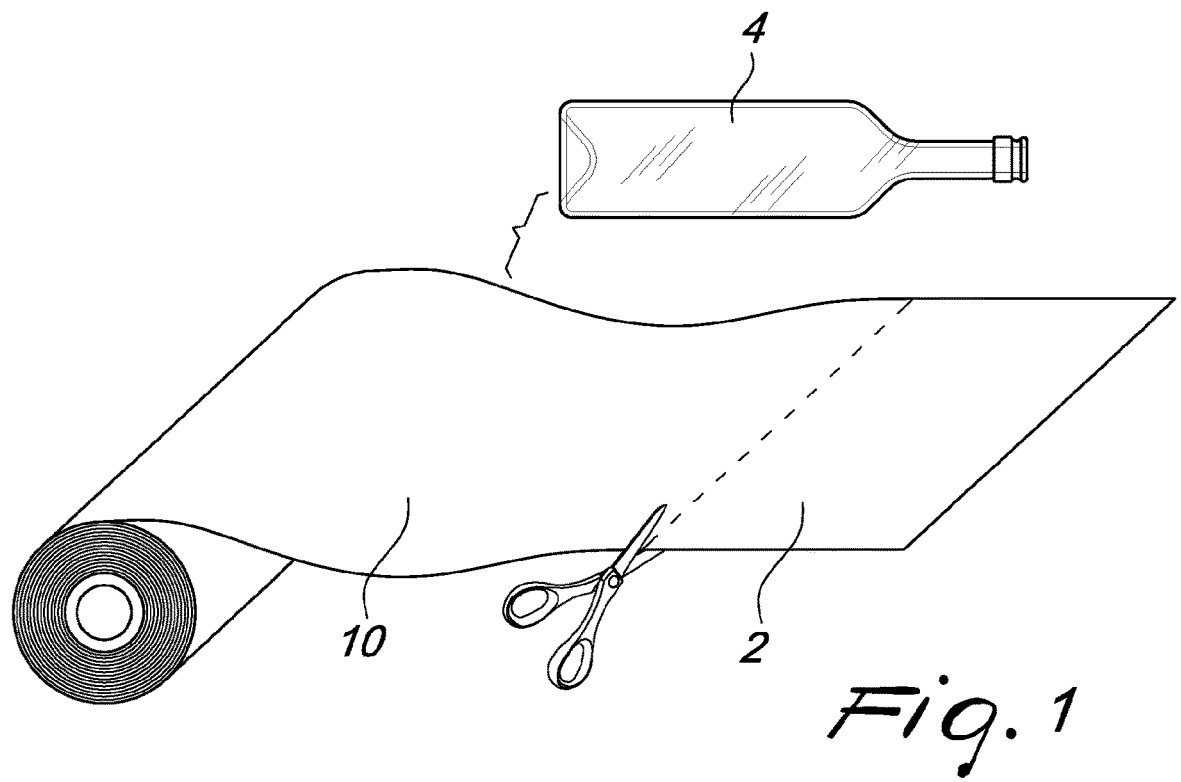
FIG. 1 is a view of an object to be decorated and of a step of preparing a carrier sheet-like medium, according to the present invention.
Figure 2:
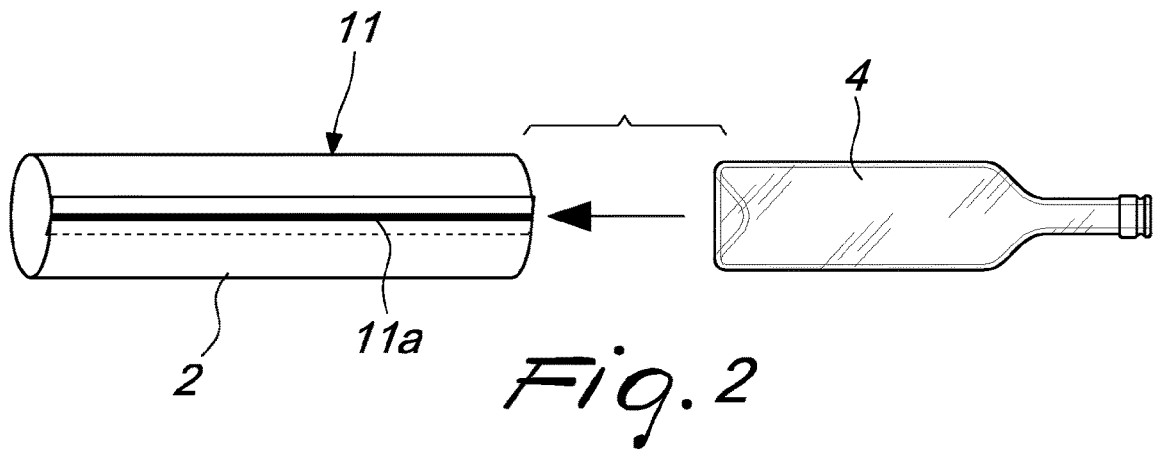
FIG. 2 is a view of the insertion of the object to be decorated in a sleeve provided by means of the carrier sheet-like medium.

With reference to the figures, the method for decorating objects by means of sublimatic inks according to the invention entails initially providing a shrink-wrap sheet-like element 2 to which at least one layer of sublimatic inks 3 is applied.

Preferably, said sheet-like element 2 is of the type commonly used for decoration by means of sleeves, i.e., is such as to be thermomechanically deformable in the radial direction of the sleeve, its dimensions in the axial direction remaining substantially unchanged.

The sheet-like element 2 has, at least on a first face thereof designed to be directed toward the object 4 to be decorated, an irregular or rough draining surface 2*a*, which has the function of creating, between the sheet-like element 2 and the object 4 to be decorated, channel systems and more particularly micro-channel systems, conveniently provided uniformly on the sheet-like element 2 and advantageously constituted by communicating cavities formed between elements, at which a throttling of the contact points between the surface of the sheet-like element 2 and the surface of the object 4 to be decorated occurs, said channel systems being adapted to allow a complete draining of the air and other gases interposed between the sheet-like element 2 and the object 4 to be decorated, so as to obtain an optimum adhesion between the sheet-like element 2 and the object 4 to be decorated, during the process for the transfer of the sublimatic inks.

Furthermore, as described hereinafter, since part of the process requires the removal of existing volumes of atmosphere between the sheet-like element 2 and the surface of the object 4 to be decorated, in the concave or convex interstitial parts said channel systems, branched over the entire surface of the sheet-like element 2, allow the emptying and transmission of the minimum pressure level present in the system, overcoming the effect that would occur without their presence between the sheet-like element 2 and the object 4 to be decorated.

More particularly, as highlighted in particular in FIG. 9, the sheet-like element 2 is provided by a base film 5 made of shrink-wrap polymeric material and by at least one working layer 6 which has the irregular surface 2*a*.

In particular, the base film 5 has, preferably, a thickness substantially comprised between 5 and 150 μm, more preferably between 35 and 70 μm, and is capable of reducing automatically at least one of its own dimensions between 5 and 95%, and more preferably between 60 and 85% of the initial dimension, as a consequence of an addition of heat with an increase of its temperature within an interval comprised between 50° and 200° C. and more preferably between 60° and 90° C.

The base film 5 can be, for example, made of PET, PVC, PLA, OPS or other materials, conveniently extruded, stretched and cooled, so as to have thermo-elastoplastic mechanical characteristics typical of the shrink-wrap sleeve.

Conveniently, if the base film 5 does not have adequate impermeability to gaseous-phase sublimatic inks, a continuously applied impermeabilizing layer, not shown, may be applied on its face facing the working layer 6, its function being to prevent the diffusion of the gaseous-phase sublimatic inks toward the base film 5. Said impermeabilizing layer can be made, for example, of polyvinyl alcohol with a high hydrolysis value.

The working layer 6 is advantageously constituted by an absorbent and adhesive layer 7, preferably made of PVOH, in which there are omnidirectional isotropic channel systems which allow each single point of intimate contact between the film and the object 4 to be decorated to be connected by micro-ducts, which allow the drainage of the sublimation gases and corresponding solvents, generated during the transfer step of the sublimatic inks.

These channel systems are obtained by applying to the layer 7 bodies 8 having a granular and/or oblong shape, having dimensions comprised substantially between 1 and 300 μm, preferably between 5 and 100 μm, adequately uniformly distributed on the working layer, with adequate distribution density and isotropic geometric arrangement with non-preferential orientations, allowing provision of the surface 2a, giving the working layer 6 a granular and channeling shape suitable for the geometric complexity of the object 4 to be decorated.

It should be noted that the non-preferential orientations of the channel systems are essential in order to avoid the forming of channels with such a flow capacity as to make them a preferential path for the gases formed during the sublimation transfer step, which would thus deform, during their outflow, the film in such a way as to make decoration impossible along the channel itself, or they would dirty the object 4 to be decorated proximate to the channel, since a significant flow of sublimation gases with respect to the remaining regions of the object would be created.

In particular, the density, shape and size of the bodies 8 are chosen in dependence on the inking materials used, the expected graphic resolution and the difficulties dictated by the shape of the objects 4 to be decorated. The integrity of the channel systems and, therefore, the structure of the bodies 8 and the perviousness of the cavities interposed between them must be maintained during all steps of the process, and therefore they must withstand thermal and mechanical stresses transmitted by the sheet-like element 2 on which they are arranged, thanks to a partial latent (or remaining) shear strength of the sheet-like element 2. Where, for example, there is flow difficulty, due to the shape of the object 4 to be decorated, one acts by modifying the size and concentration of the bodies 8 and the thermomechanical characteristics of the carrier leaf, i.e., of the sheet-like element 2.

Said granular and/or oblong bodies 8 preferably have thermomechanical characteristics such that they substantially maintain the geometric dimensions unchanged, and thus the functionality of channeling aeraulic flows, during the transfer step, i.e., during the application of pressures and temperatures suitable for the process.

For example, the bodies 8 in granular form can be made from silicates or organic substances in granular form, while the bodies 8 having an oblong form may be made from fibers of RAYON or other suitable material.

For example, when using inking substances in which the solvent used for application has already been largely evacuated, the channel system required to remove the gas phases has bodies 8 with substantially smaller cross-sections, for example 7 μm, compared to water-based inking substances that require draining channel systems with bodies 8 having a much larger cross-section, due to the greater presence of gas volumes to be evacuated, for example dimensions close to 20 μm.

Likewise, if the shape of the object 4 to be decorated has particularly conspicuous concavities and angular points, it is necessary to use bodies 8 having a larger diameter, even though the chemical-physical conformation of the inking materials and of the working layer remains constant, in order to guarantee a minimum cross-section of the channel systems, which would otherwise be occluded due to the tension stresses of the ink medium on the surface of the object 4.

Conveniently, substances capable of absorbing sublimatic inks and their solvents are present in the adhesive layer 7 so as to ensure a certain degree of dryness to the touch once the layer of sublimatic inks 3 has been applied. Said substances can be, for example, substances of the glycol family and/or substances of the anthraquinone family.

These absorbent substances allow direct printability of the medium element 2 by means of digital, rotogravure, flexographic and other printing techniques.

It should be noted that the layer of sublimatic inks 3 may be applied above the channeling surface 2a, as shown, in particular, in FIG. 9, or, as an alternative, it may also be interposed between the base film 5 and the working layer 6 and, in the latter case, the adhesive layer 7 is made of a binding material that is at least partially permeable to gases and, more precisely, to the gaseous phase of the sublimatic inks, such as, for example, ethylcellulose or synthetic binding materials in general.

Advantageously, the sheet-like element 2 may be obtained, depending on the dimensions and shape of the object 4 to be decorated, from the cutting of a continuous ribbon 10 which preferably has a higher shrink-wrapping along its transverse extension direction than along its longitudinal extension direction.

The ribbon 10 may, moreover, already have the layer of sublimatic inks 3 applied prior to cutting.

The sheet-like elements 2 may have, conveniently, a predominant extension in a longitudinal direction, so as to have a substantially rectangular shape in plan view, forming in practice a pair of long sides and a pair of short sides.

It should be noted that the ribbon 10, at regions intended for cutting, may optionally lack the working layer 6 and be constituted, at said regions, only by the base film 5.

Once the sheet-like element 2 has been prepared, two opposite ends of said sheet-like element are joined together to form a sleeve 11, which is open at its opposite axial ends and is capable of accommodating inside it the object 4 to be decorated.

In particular, the sleeve 11 is provided by arranging the face of the sheet-like element 2 provided with the inked surface 2a so that it is directed toward the inside of said sleeve.

The joining of the two ends of the sheet-like element 2 is performed, for example, by mutually overlapping the two corresponding flaps of the sheet-like element 2 and heat-sealing said flaps, preferably by interposing between them a solvent material, such as, for example, the solvent dioxolane (CAS646-06-0), as in the case, in particular, in which the base film 5 of the sheet-like element that provides the sleeve 11 is made of PET, so as to ensure an effective gas tightness between the inside and the outside of the sleeve 11 at the joining line 11a of the two flaps.

It should be noted that the region of the sheet-like element 2 that corresponds to the overlapping flap that remains on the outside of the sleeve 11 advantageously lacks the working layer 6.

At this point, one proceeds to axially insert in the sleeve 11 at least one object 4 to be decorated, which may be, for example, constituted by a bottle, as in the case shown in the figures.

In this way, the sleeve 11 is arranged around the object 4 to be decorated, covering the external part of the object 4 to be decorated, and its position, with respect to the object 4 to be decorated, depends on the position in which one wishes to transfer the image onto said object.

Preferably, but not necessarily, the sleeve 11 is provided with an axial length that is greater than the axial dimension of the object 4 to be decorated, so as to protrude with respect to the axial ends of the object 4 to be decorated, once the object 4 to be decorated has been inserted therein.

For this purpose, the sleeve 11 may be provided starting from a substantially rectangular sheet-like element 2, the long sides of which are longer than the axial length of the object 4 to be decorated, and by mutually joining the ends of the sheet-like element 2 that correspond to its long sides, so that once it is obtained the sleeve 11 can have an axial extension that is greater than the axial extension of the object 4 to be decorated.

It should be noted that it is also possible to subject the object 4 to be decorated, prior to its insertion in the sleeve 11, to a surface treatment in order to make it suitable to receive in an optimum manner the diffusion of the sublimatic gases. This treatment may, for example, consist in applying, by using devices such as spray dispensers, electrostatic spray, fluidized bed or others, organic coatings based on epoxy resins, acrylic resins, polyester, polyurethanes, and combinations thereof in liquid form based on a solvent, based on water and/or powder. These products, applied with a convenient thickness, are cured by a cycle of heating or irradiation by exposure to suitable heat/UV sources in order to achieve the desired consistency of the thickness designed to receive the sublimatic inks.

At this point, heat is applied to the sleeve 11 by exposing it to a suitable heat source so as to raise the temperature of sleeve 11 above the temperature above which shrink-wrapping of the sheet-like element 2 occurs, so as to obtain a partial shrink-wrapping of the sleeve 11 on the object 4 to be decorated, so as to obtain an envelope conveniently in contact with the object 4, in order to optimize the positioning of the graphics of the decoration on the surface of the object 4, so that each point finds its homothetic projection on the object 4 to be decorated.

In particular, by means of said shrink-wrapping of the sleeve 11, a narrowing of the transverse dimension of said sleeve 11 is obtained, so as to make at least one part of the sleeve 11 adhere against at least one portion of the object 4 to be decorated, adapting it, at least partially, to the shape of the outer surface of the object 4 to be decorated, providing a conveniently enveloping surface thereof.

Preferably, the shrink-wrapping of the sleeve 11 is provided by exposing the sleeve 11 to at least one heat source to reach quickly and uniformly the shrinking temperature for most of the surface of said sleeve.

To this end, the sleeve 11 may be, conveniently, exposed to thermal radiation sources, with surface temperatures comprised between 80° C. and 700° C., for times substantially comprised between 0.1 s and 45 s.

It should be noted that if suitable protective coatings are applied on the inner side of the sleeve 11, such as for example wax-based UV coatings with hydrophobic properties, it is possible to use superheated steam as a heat source for the shrink-wrapping of the sleeve 11.

Figure 4:
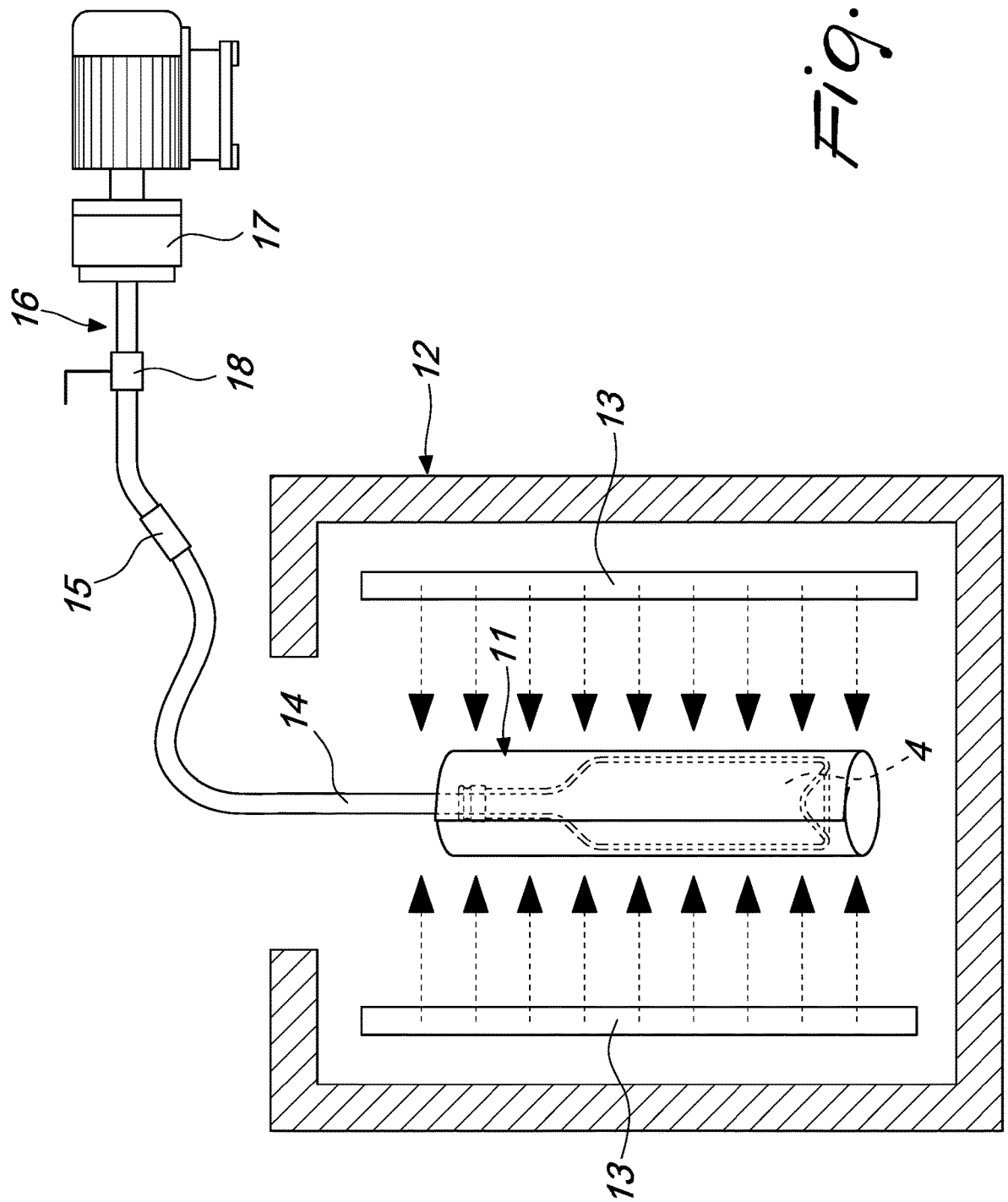
FIGS. 4 and 5 are views in sequence of the shrink-wrapping of the sleeve performed in an oven shown schematically in lateral elevation view and in sectional view.
Figure 5:
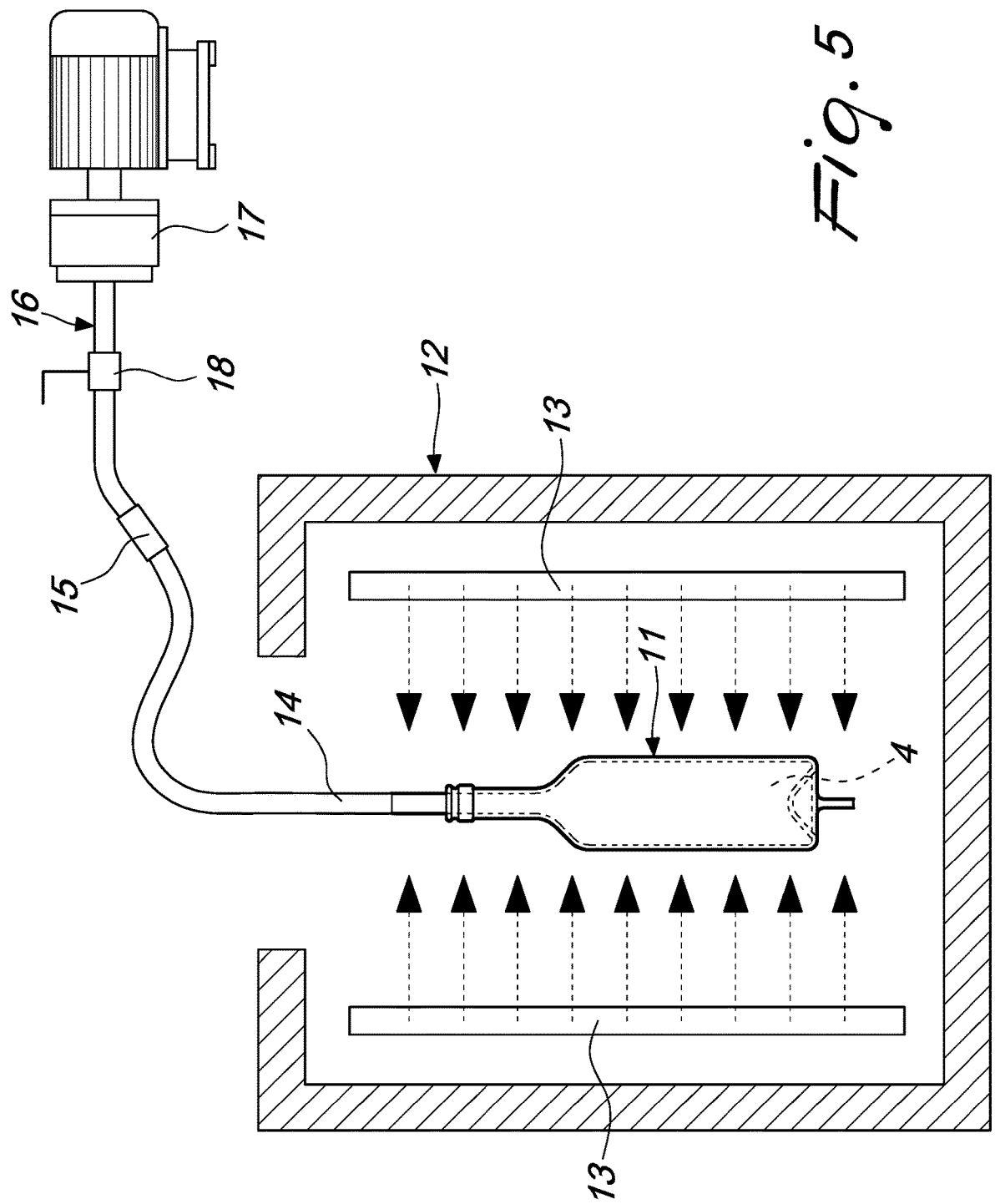
Figure 6:
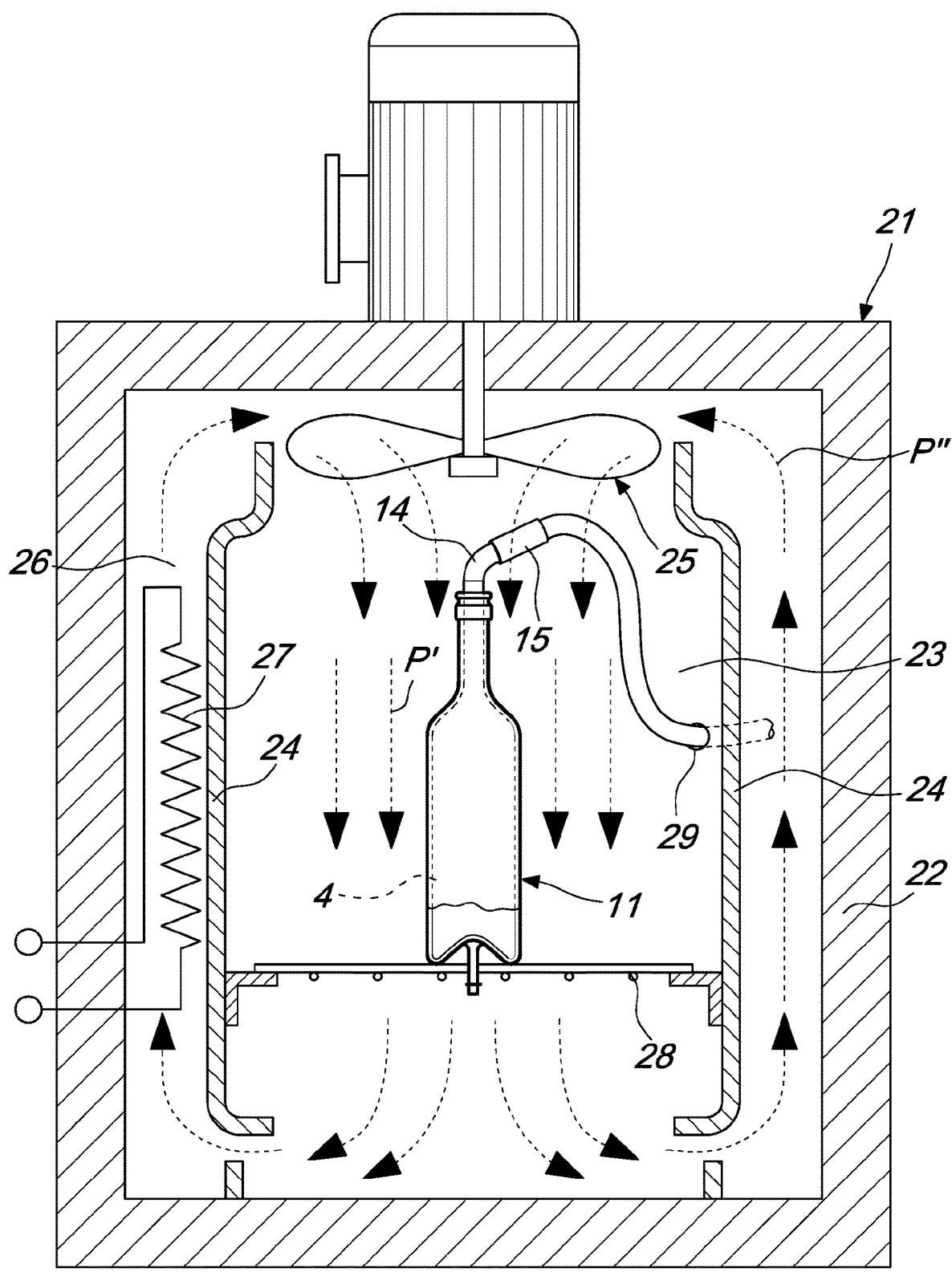
FIG. 6 is a view of the transfer of the images onto the object to be decorated, performed inside an oven shown in cross-section, highlighting how the sleeve adheres perfectly to the concave bottom of the object due to a difference in pressure applied in a thermo-elastoplastic step.

For example, as shown schematically in FIGS. 4 and 5, the shrink-wrapping of the sleeve 11 can be performed by placing the sleeve 11, with the object 4 to be decorated inserted therein, in a shrink-wrapping oven 12, preferably of the static type, conveniently having a well-like structure and provided internally with radiating panels 13 capable of emitting infrared (IR) radiation.

Once its shrink-wrapping has ended and after allowing it to cool, the shrink-wrapped sleeve 11 may have various distinct regions, depending on the shape and dimensions of the object 4 to be decorated.

Figure 11:
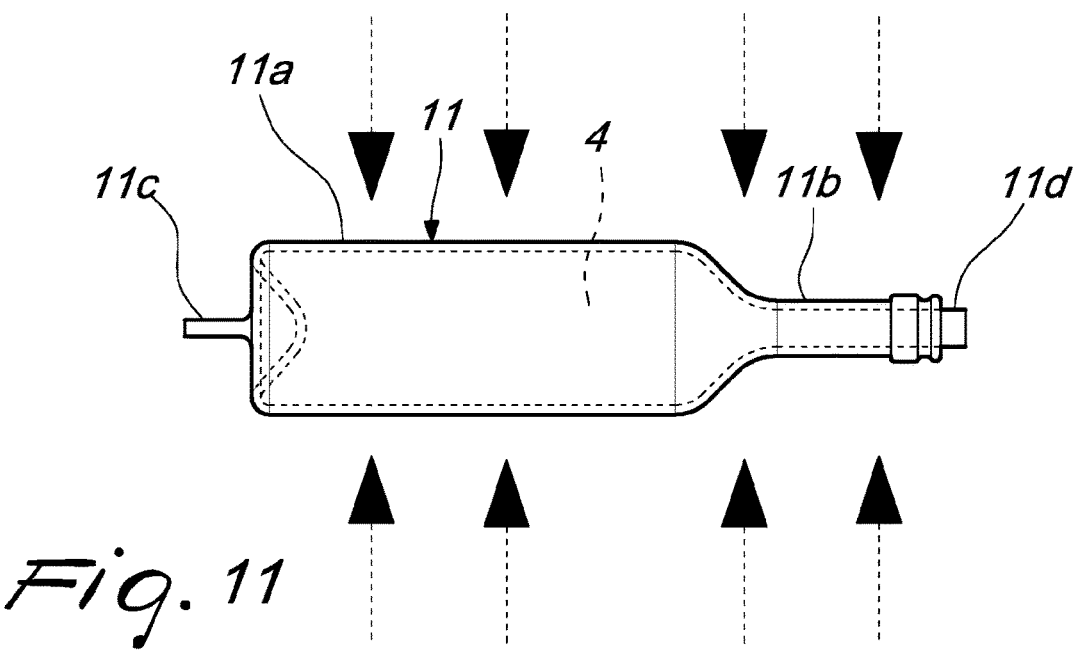

In particular, with reference to FIGS. 7 and 11, the sleeve 11 may have at least one first region 11*a*, located at the portion of the object 4 to be decorated that has the largest transverse dimension, in which the shrink-wrapped sleeve 11 adheres against the outer surface of the object 4 to be decorated with a contact pressure that depends on the shrinkage percentage of the sheet-like element 2 and on the degree of curvature of the object 4 to be decorated.

It should be noted that the pressure of the shrink-wrapped sleeve 11 against the object 4 to be decorated, although present in the first region 11*a*, is however not generally uniform.

If the object 4 to be decorated is constituted by a bottle, as in the figures, the first region 11*a* is, in practice, constituted by the region of the shrink-wrapped sleeve 11 that is located at the main body of the bottle.

The shrink-wrapped sleeve 11 may also have at least one second region 11*b* in which the contact between the shrink-wrapped sleeve 11 and the object 4 to be decorated is only partial, although the shrink-wrapping has conveniently brought the sheet-like element 2 closer to the surface of the object 4 to be decorated. In this region 11*b* the image transfer would not be possible. If the object 4 to be decorated is constituted by a bottle, said second region 11*b* corresponds in practice to the region of the shrink-wrapped sleeve 11 that is located at the neck of the bottle.

Advantageously, the shrink-wrapped sleeve 11 has, moreover, two other regions, i.e., a third region 11*c* and a fourth region 11*d* which correspond, respectively, to the end portions of the shrink-wrapped sleeve 11 that, before the shrink-wrapping, protruded beyond the axial ends of the object 4 to be decorated. In these regions 11*c* and 11*d*, the sleeve 11 is shrunk to its maximum percentage, albeit with contact pressures on the object 4 to be decorated that are not sufficient to achieve the contact intimacy and pressures needed for the transfer of the sublimatic inks.

Once the shrink-wrapping of the sleeve 11 on the object 4 to be decorated has been performed, the method continues with a subsequent step, described in more detail hereinafter, which consists in creating a difference in pressure between the inner and outer sides of the shrink-wrapped sleeve 11 on the object 4 to be decorated, in order to determine, on the inner side of said sleeve, a hydrostatic pressure that is lower than that acting on its outer side, i.e., creating a partial vacuum inside the sleeve 11 with respect to the external environment.

Preferably, before or simultaneously with the step of creating a difference in pressure between the inner side and the outer side of the shrink-wrapped sleeve 11 on the object 4 to be decorated, there is a step of state transition of the sleeve 11 by applying to the sleeve 11 at least enough thermal energy to reach and maintain a temperature of the sleeve 11 of approximately 70-90° C., preferably 80° C., i.e., a temperature that corresponds to the plastic phase transition or glass transition temperature of said sleeve, in order to achieve a uniform distribution of the pressure on the inner side of the sleeve 11, in order to obtain, in this way, by virtue of the channel systems present on the surface 2*a* of the sheet-like element 2 that provides the sleeve 11, a consequent uniform compression of the sleeve 11 against the object 4 to be decorated.

The channel systems described earlier are particularly important for the success of a diffusion of partial vacuum, or in case of positive pressure, which is uniform over the entire surface of the object-sleeve envelope and in order to avoid the "suction cup" effect of the sleeve on the surface of the object, which would preclude the diffusion of the vacuum in the concave regions of the object, or which in the event of applied positive pressure would generate air bubbles which would ruin the decoration.

The application, before or during the step that makes it possible to create a partial vacuum inside the sleeve 11, of thermal energy to the sleeve 11 for the transition of the sleeve 11 to a plastic state, reaching for example a temperature of approximately 80° C. of said sleeve or of temperatures higher than the glass transition temperature of the sheet-like element 2, allows an optimum deformation of the sleeve 11 and of the corresponding surface coupling with the object 4 to be decorated, by virtue of the reaching of the plastic phase of the sheet-like element 2, avoiding deterioration and fractures due to predominant elasto-rigid characteristics that would occur at ambient temperature or in any case at temperatures not so close to the glass transition temperature and would cause the loss of tightness and therefore the loss of partial vacuum inside the sleeve 11, and at the same time makes it possible to define the placement of the decoration obtained during the previous shrink-wrapping step, in the thermal interval that precedes the start of the sublimatic graphic transfer.

In other words, the temperature interval that exists between the glass transition step of the sheet-like element and the sublimation temperature is utilized advantageously so as to maintain the placement of the envelope obtained in the shrink-wrapping step. Should the application of the difference in pressure occur at a more advanced thermal stage, the thermo-elastoplastic characteristics of the sheet-like element 2, which at high temperatures tends to lose its shape and to yield under stress, would lead the sheet-like element 2 to a change in the shape of the enveloping surface, causing the loss of the placement of the decoration (usually with tight tolerances), obtained during the shrink-wrapping step, which would therefore be inconvenient for optimum and faithful graphic transfer.

At this point, heat is applied additionally, preferably up to a temperature of approximately 150-200° C., to the sleeve 11 shrink-wrapped on the object 4 to be decorated, preferably already subjected to a plastic phase transition temperature, i.e., approximately 80° C., and also subjected to a difference in pressure between its inner and its outer side, so as to cause the sublimation of the sublimatic inks, which are thus transferred onto the surface of the object 4 to be decorated.

The method ends with the extraction of the decorated object from the sleeve 11.

Figure 15:
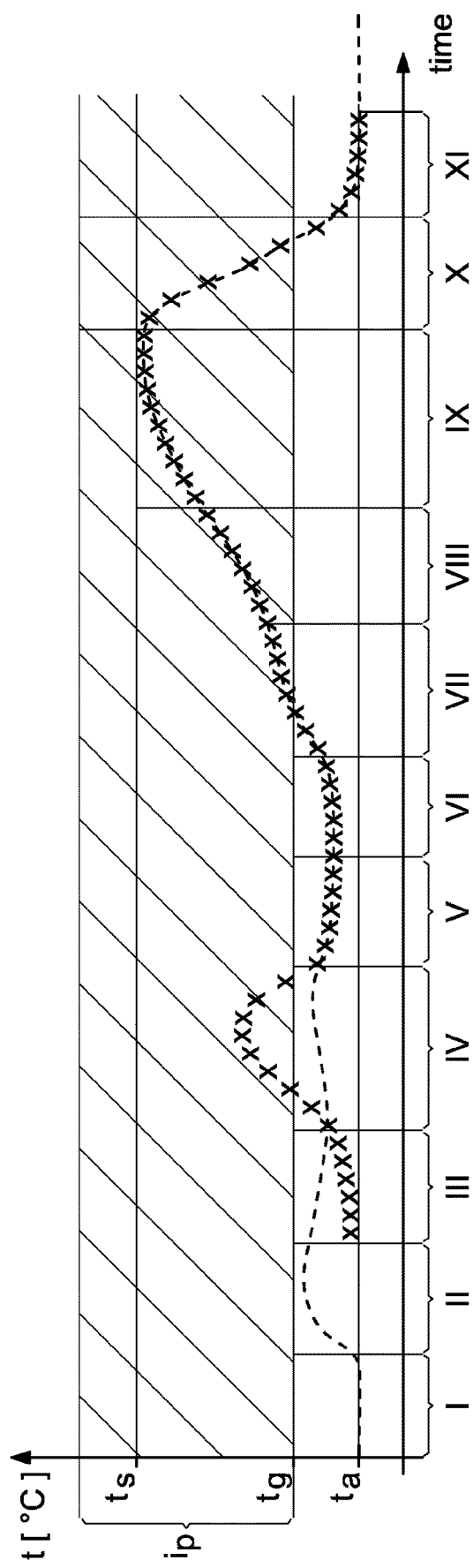
FIG. 15 is a chart of the temperatures reached during the execution of the method according to the invention.

FIG. 15 shows, by way of example, a chart of the temperature trend of the sleeve 11 and of the object to be decorated during various steps of the method according to the invention, where $t_a$ designates the ambient temperature, $t_s$ designates the sublimation temperature of the inks, $t_g$ designates the glass transition temperature of the sleeve 11 and $i_p$ designates the temperature range of the plastic phase of the sleeve 11.

Figure 16:
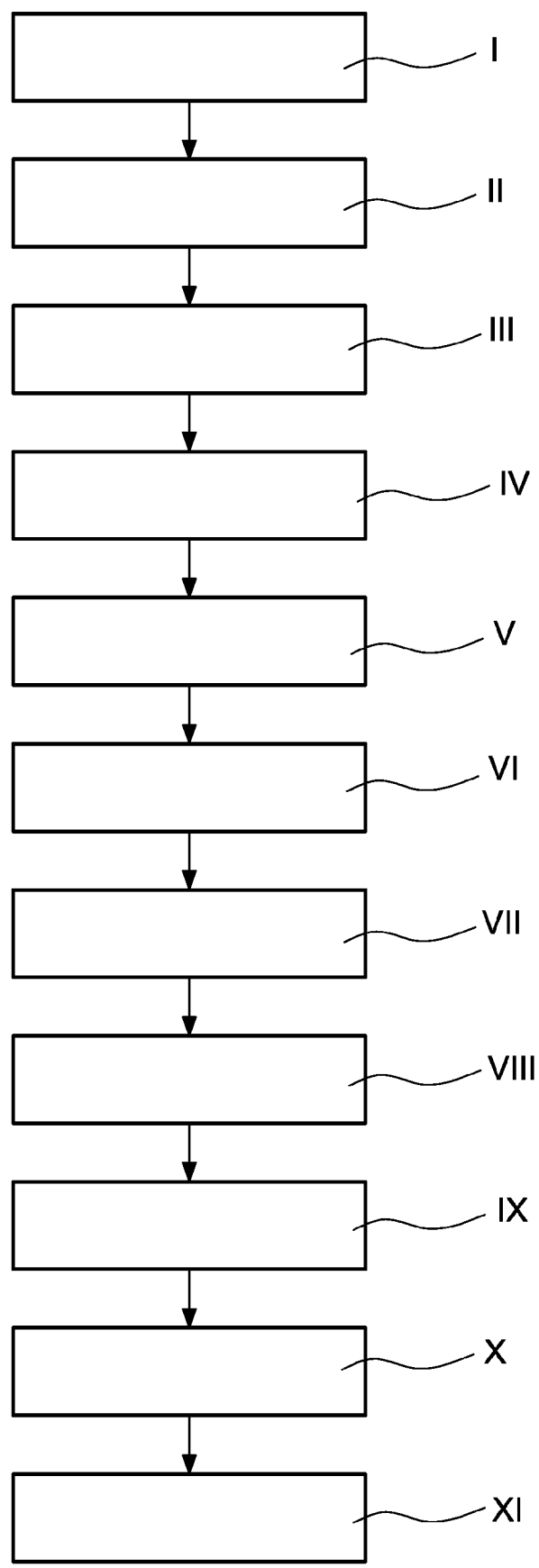
FIG. 16 is a flowchart of the steps of the method according to the invention.

The steps of the method indicated in FIG. 15 are also represented schematically in the flowchart of FIG. 16, wherein: I designates a first step, which consists in placing an object 4 to be decorated, such as a bottle, on a processing line; II designates a second step, which consists in heating the bottle to a temperature substantially equal to the temperature $t_g$; III designates a third step, which consists in applying the sleeve 11 at ambient temperature to the preheated bottle; IV designates a fourth step, which consists in applying heat for the shrink-wrapping of the sleeve 11; V designates a fifth step, which consists in rendering the wrapping of the bottle provided by the sleeve 11 hermetic; VI designates a sixth step of optional storage, with consequent adaptation of the wrapping to the storage temperatures; VII designates a seventh step, which consists in heating the wrapping hermetically connected to a pressure tank, reaching the plastic phase of the sleeve 11 ($t>t_g$); VIII designates an eighth step, which consists in heating the wrapping with application of a difference in pressure between the inside and the outside of the sleeve 11 and thus of the wrapping; IX designates a ninth step, which consists in further heating of the wrapping with application of the difference in pressure to cause the sublimation transfer of the inks; X designates a tenth step, which consists in cooling the wrapping and continuing the sublimation transfer of the inks to depletion; and XI designates an eleventh step, which consists in removing the sleeve 11 from the bottle, with consequent conclusion of the processing cycle.

According to a first embodiment of the method according to the invention, shown by way of example in FIGS. 1 to 9, the phase that consists in creating a pressure difference between the inside and the outside of the sleeve 11 is performed by extracting air from the inner side of the sleeve 11.

Figure 3:
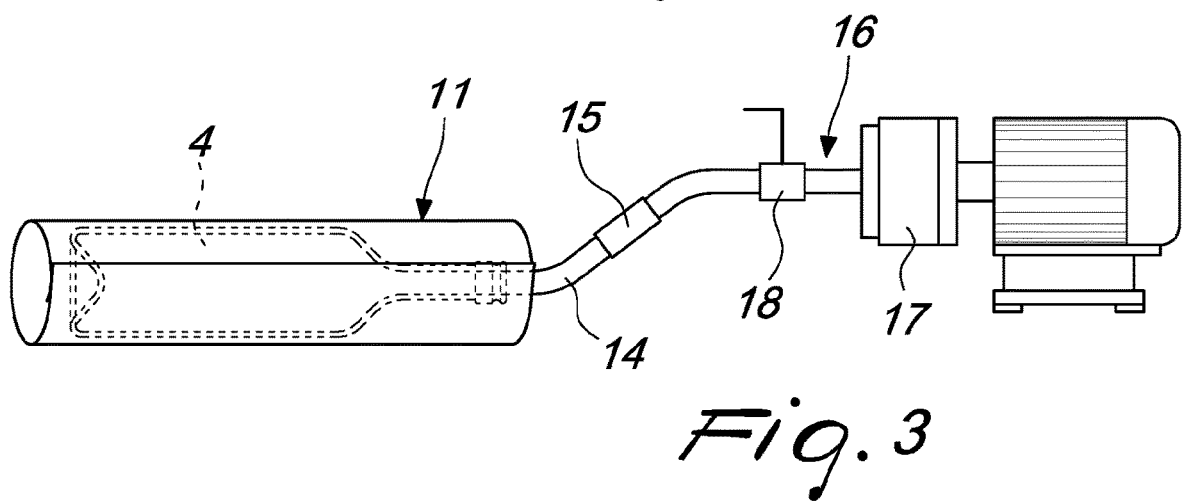
FIG. 3 is a view of the connection of means for creating a difference in pressure between the inside and the outside of the sleeve.

In this case, as shown in FIG. 3, prior to performing the shrink-wrapping of the sleeve 11, the inlet end of at least one air suction duct 14 is inserted, through at least one end of the sleeve 11, into said sleeve.

In particular, the suction duct 14 is inserted in the sleeve 11 for a portion that is sufficient to ensure that even after the shrink-wrapping of the sleeve 11 at least part of the suction duct 14 remains inside the shrink-wrapped sleeve 11.

The suction duct 14 is suitable to be connected, for example via a connection coupling 15, to an air suction line 16, which comprises, for example, a vacuum pump 17 and optionally a valve 18 for opening or closing the connection between the suction duct 14 and the vacuum pump 17.

It should be noted that the connection of the suction duct 14 to the suction line 16 may also be provided after performing the shrink-wrapping of the sleeve 11.

Optionally, if the object 4 to be decorated is constituted by a bottle, the suction duct 14 can be inserted in the mouth of said bottle.

As shown in FIGS. 4 and 5, in order to shrink-wrap the sleeve 11 one proceeds in this case by inserting the sleeve 11 in the shrink-wrapping oven 12, with the object 4 to be decorated inside, as well as a part of the suction duct 14.

Advantageously, after the shrink-wrapping of the sleeve 11 on the object 4 to be decorated and on the suction duct 14, a sealing of the axial ends of the sleeve 11 is performed in order to ensure gas tightness between the inner side and the outer side of said sleeve at its ends.

In particular, at the end of the sleeve 11 in which the suction duct 14 is inserted, which in the example of the figures is formed by the fourth region 11d of the shrink-wrapped sleeve 11, one proceeds by creating the hermetic seal between the sleeve 11 and the outer surface of the suction duct 14, for example by means of an annular element 19, which is placed around the sleeve 11 and may, for example, be provided by winding adhesive tape, conveniently of the type capable of withstanding high temperatures, or by a shrinking band, or by means of a suitable mechanical connector.

At the other end of the sleeve 11, i.e., with reference to the example in the figures, at the third region 11c of the shrink-wrapped sleeve 11, the end opening of the sleeve 11 is likewise rendered hermetic by means of a mechanical clamping provided, for example, by means of a clamp 20 or the like, as shown in FIG. 7, heat-sealing or ultrasonic welding or by using an adhesive tape or a cap or other similar elements, so as to advantageously ensure a hermetic seal for pressures substantially equal to approximately $-10^{-3}$ bar.

Once this sealing of the ends of the sleeve 11 has been performed, it is possible to proceed with the activation of the connection of the suction duct 14 to the vacuum pump 17, so as to achieve the suction of air from the inside of the sleeve 11.

The suction of air from the inner side of the sleeve 11 is performed once the glass transition temperature of the sleeve 11 has been reached and is maintained concurrently with the application of heat in order to cause the sublimation of the inks.

For this purpose, the shrink-wrapped and sealed sleeve 11 is advantageously inserted in a hot air ventilated oven 21 capable of achieving a heat exchange by radiation and by hot air circulation.

Conveniently, the oven 21 comprises an enclosure 22, which forms internally a heating chamber 23 adapted to accommodate the object to be decorated, which is inserted in the sleeve 11, as well as at least part of the suction duct 14.

The heating chamber 23 is at least partially delimited by heat radiation means, constituted conveniently by radiating panels 24.

The oven 21 is provided furthermore with means for the forced circulation of air, constituted for example by at least one fan 25, preferably arranged on the upper side of the heating chamber 23, which can be activated on command to generate a flow of air inside the heating chamber 23, preferably directed along the main axes of the object to be decorated.

Inside the enclosure 22 of the oven 21 there is also, along air circulation passages 26 defined outside the heating chamber 23, preferably between the enclosure 22 and the radiating panels 24, at least one resistance heater 27 which can be supplied with electric power to heat the air flow generated by the fan 25.

In the heating chamber 23 there is, furthermore, a supporting grid for the sleeve 11 with the object 4 to be decorated inside it, in order to allow the passage of the air flow generated by the fan 25.

Advantageously, the oven 21 is also provided with means for communication between the inside of the sleeve 11 and air extraction means, which in the illustrated case are for example constituted by at least one opening 29, formed in the heating chamber 23, which can be crossed by the suction duct 14, in order to allow the connection of the suction duct 14 to the air suction line 16, which is kept conveniently outside the enclosure 22 and is conveniently connected to the suction duct 14 by means of the coupling 15.

Once the sleeve 11 with the object 4 to be decorated inserted inside it and the suction duct 14 have been inserted in the oven 21 and the connection of the suction duct 14 to the air suction line 16 and more particularly to the vacuum pump 17 has been provided, it is possible to proceed to start the oven 21, so as to strike the sleeve 11 with a flow of hot air having for example a speed substantially comprised between 4 and 60 m/s and a temperature substantially comprised between 80° and 250° C., and to activate the vacuum pump 17, so as to create inside the sleeve 11 a negative pressure, i.e., a pressure lower than the ambient pressure, for example between −700 and −999 millibars, preferably between −980 and −990 millibars.

It should be noted that the flow of air that is generated inside the oven 21 and strikes the sleeve 11 makes it possible to apply a positive pressure, i.e., a pressure greater than the ambient pressure, to the outer side of the sleeve 11, which contributes to create the difference in pressure between the inner and outer sides of said sleeve, facilitating the compression of the sleeve 11 against the outer surface of the object 4 to be decorated.

It should be noted that it is also possible that in certain fluid-dynamic conditions, which are obtainable conveniently by controlling the flow of air inside the oven 21, the connection of the inner side of the sleeve 11 to the suction line 16 may be rendered superfluous, the pressure exerted on the outer side of the sleeve 11 by means of said flow of air being sufficient to obtain the desired compression of the sleeve 11 against the outer surface of the object 4 to be decorated.

During the retention of the sleeve 11 with the object 4 to be decorated inserted therein in the oven 21 and the application in the sleeve 11 of the degree of vacuum generated in the sleeve 11 by the vacuum pump 17 by means of the suction duct 14, a flow of gas phases is obtained from the inside of the sleeve 11 toward the outside thereof which comprise any air present in the object 4 to be decorated, as in the case in which said object is constituted by a bottle, the air present in the interspace 30 between the sheet-like element 2 that provides the sleeve 11 and the outer surface of the object 4 to be decorated, as well as the gases created by the presence of the state of pressure and temperature generated inside the sleeve 11.

More particularly, by virtue of the communication, made possible by the channel systems formed by the irregular surface 2a of the sheet-like element 2, between the interspace 30 present between the sleeve 11 and the object 4 to be decorated and the suction duct 14, one obtains, between the sleeve 11 and the object 4 to be decorated, the presence of a pressure that is lower than that applied by the atmosphere on the outer side of the sleeve 11, with a consequent increase in the compression of the sleeve 11 against the object 4 to be decorated and the extraction of the gas phases that are created in the interspace 30, so as to prevent the generation of counterpressures that can lead to swellings of the sleeve 11 and therefore cause defects in the transfer of the sublimatic inks onto the object 4 to be decorated.

Furthermore, following prolonged exposure to a heat source, the sheet-like element 2 loses its shrink-wrap characteristics, gradually assuming an elastoplastic behavior, while maintaining the characteristics of substantial impermeableness to gases in the direction of its thickness.

This predominantly thermo-elastoplastic behavior assumed by the sheet-like element 2, in combination with the difference in pressure created between the inner and outer sides of the sleeve 11, allows the sheet-like element 2 to further adapt to the surface of the object 4 to be decorated, so as to achieve certainty of contact between the sleeve 11 and the object 4 to be decorated.

It should be noted, moreover, that the greater the difference in pressure applied to compress the sleeve 11 against the object 4 to be decorated, the more the inked regions of the sheet-like element 2 adapt to the outer surface of the object 4 to be decorated.

It should also be considered that sublimatic inks are composed of various substances having various degrees of volatility in relation to the locally occurring temperatures and pressures.

Accordingly, as the temperature of the sleeve 11 in the oven 21 and the level of partial vacuum inside it due to the air suction performed by the vacuum pump 17 increase, the non-useful gas phases that are produced progressively and could interfere with the transfer of the sublimatic inks onto the object 4 to be decorated are extracted from the sleeve 11.

In this way, the useful gas phases, i.e., those of the sublimatic inks, which are created at temperatures and pressures close to the final ones of the process, will find, as they are generated, the surface of the object 4 to be decorated directly facing the layer of the sublimatic inks 3 and, therefore, ready to receive them by diffusion, thus providing the decoration of the object 4.

According to a different embodiment of the method according to the invention, shown in FIGS. 10 to 14, the step that consists in creating a difference in pressure between the inside and the outside of the sleeve 11 can also be provided by packaging the sleeve 11, with the object 4 to be decorated inserted therein, in a bag 31 in which vacuum is created.

Advantageously, the bag 31 is of a heat-sealable type and has, at least on its inner side, an irregular surface defining channel systems, not unlike those described earlier.

Conveniently, the bag 31 may be provided by means of one or more sheet-like elements having a structure that is similar or substantially identical to that of the sheet-like element 2 by means of which the sleeve 11 is provided.

It should be noted that in order to achieve good results with this second embodiment at least one empty hollow tank adapted to act as a vacuum tank must be provided inside the bag 31. In the case of bottle decoration, the bottle itself acts as the vacuum tank. As an alternative, it is possible to insert alternative tanks, such as a hollow sphere or an element similar to a cup. The presence of the tank is fundamental, since in the absence of a constantly connected pump, as in the first embodiment, which maintains the state of partial vacuum throughout the entire transfer phase, in this second case it is necessary to provide a tank that absorbs the positive pressures created during the gas phases of sublimation. Once again, in order to connect said tank to the entire contact surface between the sheet-like element 2 and the object 4 to be decorated, the channel systems of the sheet-like element 2 of the bag 31 are fundamental for a correct balancing of the internal partial vacuum, ensuring the conveyance of the generated gases towards the tank at a lower pressure. In fact, in the absence of such channel systems on the sheet-like element 2 and therefore on the bag 31, gas accumulations and therefore increasing local partial pressures would be obtained, which would overcome the pressure applied by the sheet-like element, during the transfer step, and would ruin the result of the decoration and would not allow a uniform diffusion of the partial vacuum generated during the process.

Figure 10:
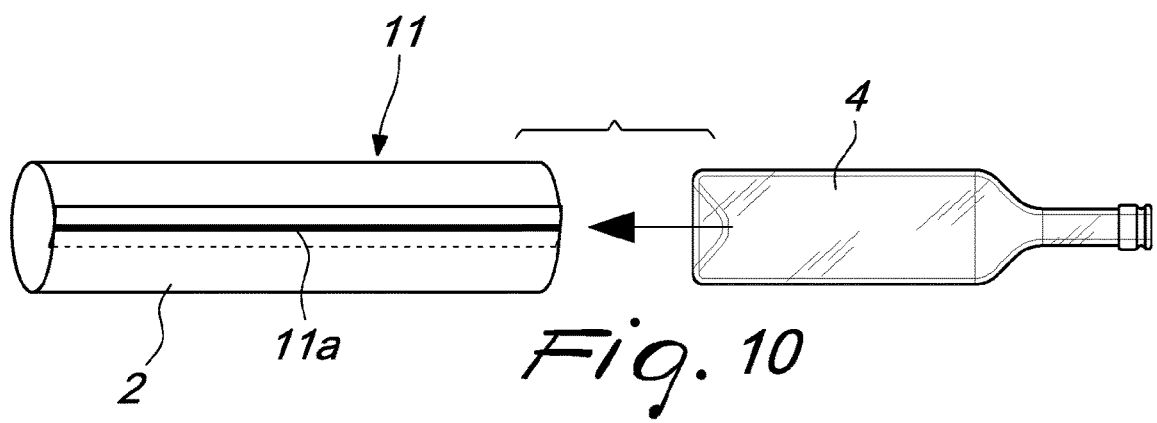
FIGS. 10 to 12 are schematic lateral elevation views of a sequence of steps of a second embodiment of the method according to the invention.

In particular, in this second embodiment one proceeds, similarly to what has been described above with respect to the first embodiment, by arranging initially the sheet-like element 2 with the layer of sublimatic inks 3 applied thereto and by joining two ends of the sheet-like element 2 in order to provide a sleeve 11 in which the object 4 to be decorated is inserted axially, as shown in FIG. 10.

Again as in the first embodiment, in this case also, at this point one proceeds to perform the at least partial shrink-wrapping of the sleeve 11 on the object 4 to be decorated by applying heat, as shown schematically in FIG. 11.

For example, the shrink-wrapping of the sleeve 11 may be provided, in this case also, by introducing the sleeve 11, with the object 4 to be decorated inserted therein, in the shrink-wrapping oven 12, so as to bring the temperature of the sleeve 11 to substantially between 70° C. and 90° C., by exposing it, for example, to a source of thermal radiation placed at a temperature substantially between 80° C. and 700° C., for a time comprised between 0.1 s and 45 s.

Figure 12:
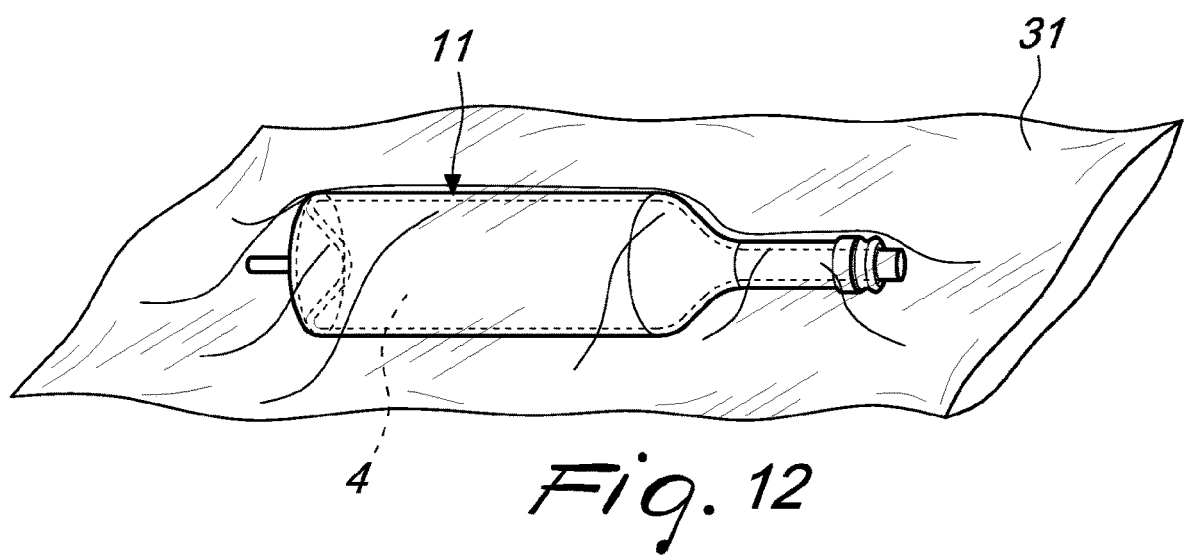

Once the shrink-wrapping of the sleeve 11 has been performed, the shrink-wrapped sleeve 11 with the object 4 to be decorated inserted therein is removed from the shrink-wrapping oven 12 and, preferably after allowing it to cool, is placed in the bag 31, as shown in FIG. 12.

Figure 13:
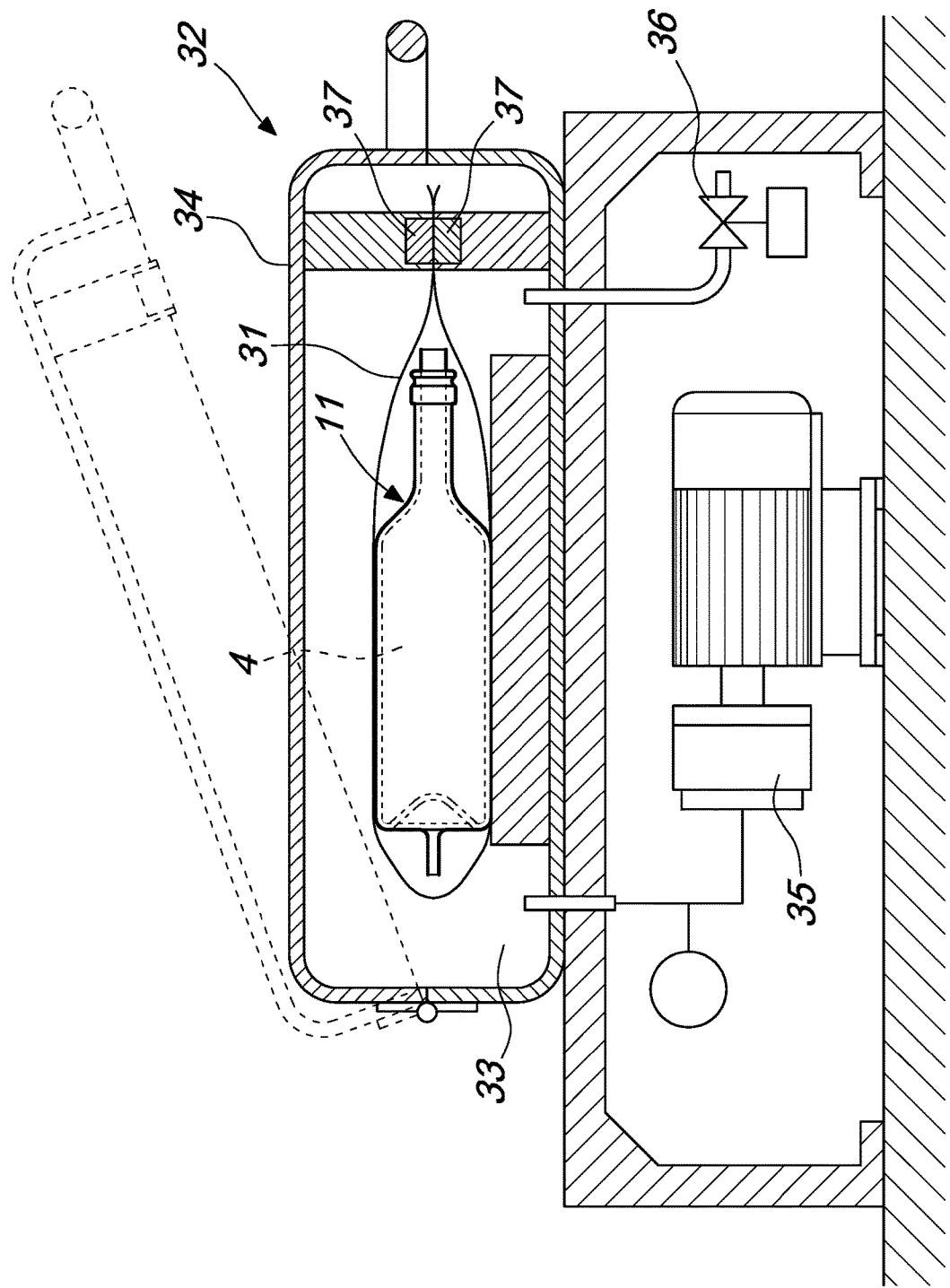
FIG. 13 is a sectional lateral elevation view of a vacuum packaging machine that can be used in the second embodiment of the method according to the invention, during the vacuum packaging in a bag of the object to be decorated, inserted in the sleeve.
Figure 14:
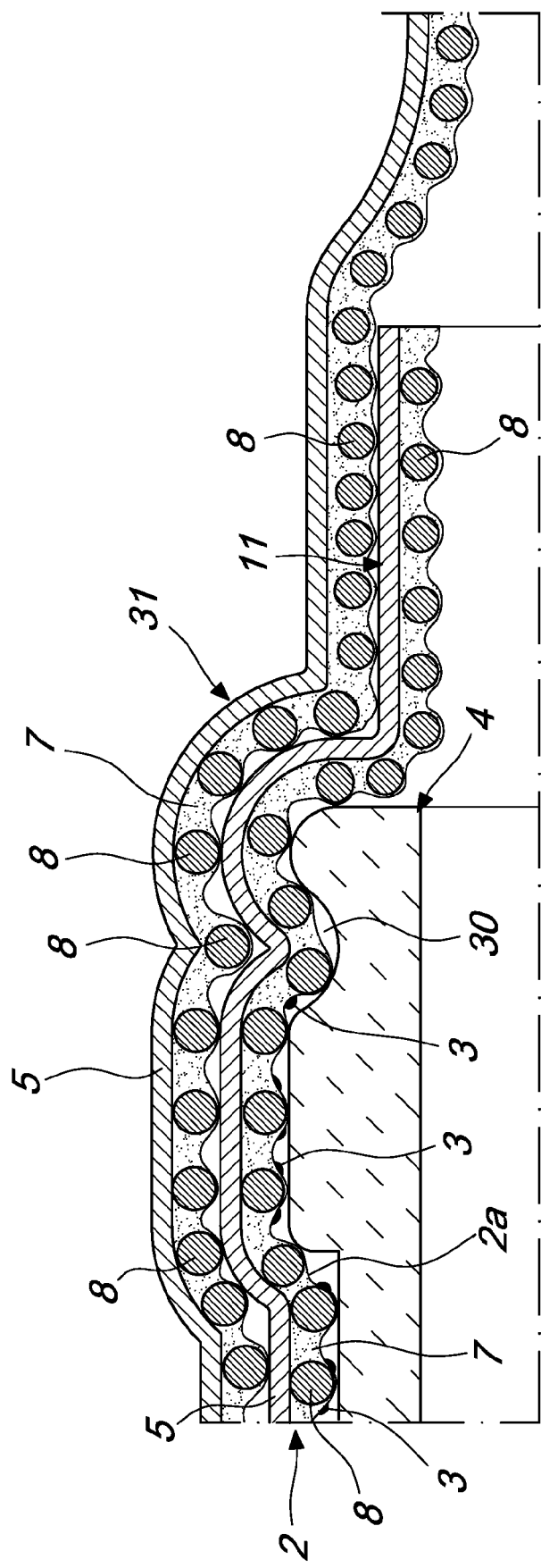
FIG. 14 is a partial sectional enlarged-scale view of the object to be decorated, inserted in the sleeve and packaged inside a vacuum bag in accordance with the second embodiment of the method according to the invention.

At this point, as shown in FIG. 13, the vacuum is created in the bag 31 and then the bag 31 is sealed.

For example, as shown in FIG. 13, the creation of the vacuum and the sealing of the bag 31 are performed by means of a vacuum packaging machine 32 of the bell type, which has a vacuum chamber 33, accessible by means of an openable lid 34 and connected to an air extraction pump 35, which makes it possible to create in the vacuum chamber 33 a degree of vacuum equal to for example approximately $-10^{-3}$ bar.

The vacuum chamber 33 is also connected to an ambient air intake valve 36, which allows the ambient pressure in the vacuum chamber 33 to be restored once the operating cycle of the machine has been completed. Conveniently, inside the vacuum chamber 33 there is furthermore a pair of bars 37 for sealing the bag 31, which are constituted by adapted electrical resistance heaters.

In practice, with the vacuum packaging machine 32, after introducing the bag 31 in the vacuum chamber 33 and closing the lid 34, the air extraction pump 35 is activated until the desired vacuum is reached in the vacuum chamber 33 and therefore in the bag 31; then the vacuum sealing of the bag 31 is performed proximately to its access mouth and subsequently atmospheric air is reintroduced in the vacuum chamber 33, through the opening of the intake valve 36, so that it is possible to open the lid 34 again and remove the bag 31 with the sleeve 11 and the object 4 to be decorated inserted in the sleeve 11 vacuum packed inside it.

At this point, the bag 31 with the sleeve 11 and the object 4 to be decorated vacuum-packed inside it are subjected to heating by applying heat, preferably in the oven 21, so as to reach the sublimation temperature of the sublimatic inks with consequent transfer of the inks onto the object 4 to be decorated.

During the ink transfer step, the channel systems of the sheet-like element 2 of the sleeve 11 and of the inner side of the bag 31 allow the gas phases that are formed to flow, toward the vacuum tank, so as to ensure uniformity in the contact pressure of the sheet-like element 2 on the object to be decorated.

Figure 17:
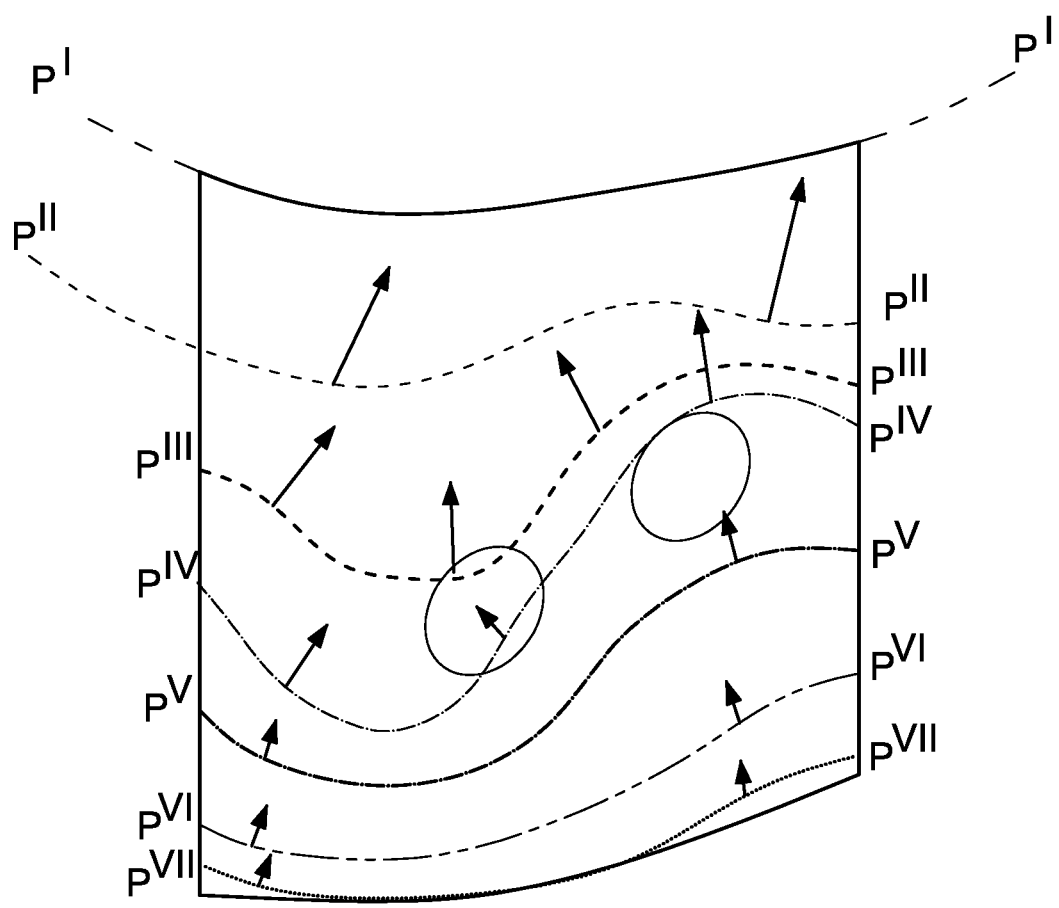
FIG. 17 is a schematic view of the flow of the gases generated in the sleeve due to the channel systems that are present.

FIG. 17 shows schematically, by way of example, a possible distribution, in a portion of the sleeve 11, of the isobar lines of the progressively increasing partial pressures, $p^I$, $p^{II}$, $p^{III}$, $p^{IV}$, $p^V$, $p^{VI}$ of the sublimatic gases generated during the sublimation transfer of the inks as well as of the corresponding flow vectors inside the channel systems of the sheet-like element 2.

After sufficient time for the complete sublimation of the inks has elapsed, the bag 31 is extracted from the oven 21 and is then opened so as to remove the sleeve 11 with the decorated object 4 inside it.

At this point, all that remains is to remove the sleeve 11 so as to release the decorated object 4.

In practice it has been found that the invention achieves the intended aim and objects, providing a method that allows the optimum transfer of sublimatic inks even on objects with a complex shape.

The invention thus conceived is susceptible of numerous modifications and variations, all of which are within the scope of the accompanying claims; all the details may furthermore be replaced with other technically equivalent elements.

In practice, the materials used, as long as they are compatible with the specific use, as well as the contingent shapes and dimensions, may be any according to the requirements and the state of the art.

The disclosures in Italian Patent Application no. 102020000015289, from which this application claims priority, are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A method for decorating a bottle having a mouth, by means of sublimatic inks, the method comprising:
   providing a shrink-wrap sheet-like element to which at least one layer of sublimatic inks is applied and which is provided, at least on one first face thereof designed to be directed toward the bottle to be decorated, with an irregular surface,
   joining two opposite ends of said sheet-like element in order to obtain a hollow sleeve with said first face of said sheet-like element directed toward the inside of said sleeve and two axial ends,
   inserting axially in said sleeve one single bottle to be decorated, before shrink-wrapping,
   inserting through at least one end of said sleeve and the mouth of said bottle an inlet end of at least one suction duct for aspirating air inside said sleeve by suction,
   applying heat in order to obtain an at least partial shrink-wrapping of said sleeve in order to make at least one part of said sleeve adhere against at least one portion of said bottle to be decorated and said duct,
   creating a difference in pressure between the internal side and the outer side of said sleeve in order to establish a lower hydrostatic pressure on the inner side of said sleeve than on its outer side by applying suction though said duct, and
   applying heat in order to cause sublimation of said sublimatic inks.

2. The method according to claim 1, comprising before or during said step of creating a difference in pressure, determining a transition of said sleeve into a plastic state.

3. The method according to claim 1, wherein said difference in pressure is created by aspirating air from the inner side of said sleeve.

4. The method according to claim 1, comprising, before said shrink-wrapping, inserting through at least one end of said sleeve at least one duct for aspirating air inside said sleeve.

5. The method according to claim 4, comprising, after said shrink-wrapping, sealing the axial ends of said sleeve in order to create a gas-tight seal between the inner side and the outer side of said sleeve.

6. The method according to claim 1 comprising, after said sealing, aspirating air through said suction duct by means of a vacuum pump.

7. The method according to claim 1, characterized in that said suction of air from the inner side of said sleeve is performed simultaneously with the application of heat in order to cause the sublimation of the sublimatic inks in a ventilated oven.

8. The method according to claim 1, characterized in that said sheet-like element can be printed directly with sublimatic inks by means of printing methods chosen from a group consisting of digital printing, rotogravure, flexographic printing.

* * * * *